US011719159B2

(12) United States Patent
Kisun

(10) Patent No.: US 11,719,159 B2
(45) Date of Patent: Aug. 8, 2023

(54) TRANSFER TUBE ASSEMBLY

(71) Applicant: PRATT & WHITNEY CANADA CORP., Longueuil (CA)

(72) Inventor: Gavin Kisun, Oakville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 157 days.

(21) Appl. No.: 17/246,836

(22) Filed: May 3, 2021

(65) Prior Publication Data
US 2022/0349344 A1 Nov. 3, 2022

(51) Int. Cl.
*F16L 3/08* (2006.01)
*F02C 7/22* (2006.01)
*F16L 39/04* (2006.01)

(52) U.S. Cl.
CPC .............. *F02C 7/222* (2013.01); *F16L 3/08* (2013.01); *F16L 39/04* (2013.01); *F05D 2260/60* (2013.01)

(58) Field of Classification Search
CPC ......... F16L 39/04; F16L 27/12; F16L 27/127; F16L 27/1273; F16L 51/00; F16L 27/113
See application file for complete search history.

(56) References Cited

U.S. PATENT DOCUMENTS

| 420,220 | A | * | 1/1890 | Amos | ...................... B61G 5/08 |
| | | | | | 285/224 |
| 3,873,134 | A | * | 3/1975 | Sammaritano | .......... F16L 39/00 |
| | | | | | 285/334.3 |
| 4,066,281 | A | | 1/1978 | DeBonis | |
| 5,106,129 | A | * | 4/1992 | Camacho | .............. F16L 27/026 |
| | | | | | 285/233 |
| 5,261,240 | A | | 11/1993 | Oyler et al. | |
| 8,205,643 | B2 | | 6/2012 | Lee et al. | |
| 10,294,865 | B2 | | 5/2019 | Morenko | |
| 2004/0032123 | A1 | * | 2/2004 | Chu | ...................... F16L 27/113 |
| | | | | | 285/146.1 |
| 2022/0127974 | A1 | * | 4/2022 | Lefebvre | ............. F16L 27/1274 |

FOREIGN PATENT DOCUMENTS

| CA | 2714826 | C | | 7/2014 | |
| DE | 102016226019 | A1 | | 6/2018 | |
| FR | 2203026 | A1 | * | 5/1974 | |
| FR | 2639702 | A1 | * | 6/1990 | |
| FR | 2934027 | A1 | * | 1/2010 | .............. F16L 25/12 |
| GB | 2118263 | A | * | 10/1983 | .............. F16L 17/00 |

OTHER PUBLICATIONS

European Search Report issued in EP counterpart application No. 221714454 dated Sep. 29, 2022.

* cited by examiner

*Primary Examiner* — Zachary T Dragicevich
*Assistant Examiner* — James A Linford
(74) *Attorney, Agent, or Firm* — Norton Rose Fulbright Canada LLP

(57) ABSTRACT

A transfer tube assembly comprises a transfer tube slidably engaged in sealing engagement with a first component. The transfer tube has a shoulder engageable with a stopper for limiting relative axial movement between the transfer tube and the first component. The shoulder has an abutment surface facing a corresponding bore surface of the first bore of the first component. The abutment surface and the bore surface are configured to generate axially opposing reaction forces in response to the abutment surface and the bore surface contacting each other.

18 Claims, 5 Drawing Sheets

TRANSFER TUBE ASSEMBLY

TECHNICAL FIELD

This disclosure relates generally to fluid transfer and, more particularly, to a transfer tube assembly for transferring fluid in, for example, a fluid transfer system for a gas turbine engine or the like.

BACKGROUND OF THE ART

Various systems are known in the art for transferring fluid such as coolant, lubricant or fuel between components of a gas turbine engine. While these known systems have various advantages, there is still room in the art for improvement.

SUMMARY

In one aspect, there is provided a transfer tube assembly comprising: a first component having a first bore; a second component having a second bore; a transfer tube fluidly connecting the first component to the second component, the transfer tube extending along a longitudinal axis from a first end to a second end, the first end sealingly slidably received in the first bore of the first component and the second end sealingly slidably received in the second bore of the second component, the transfer tube having a shoulder projecting from an outer surface thereof and engageable with a corresponding stopper for limiting axial movement of the transfer tube relative to the first and second components, the shoulder having an abutment surface facing a corresponding bore surface of the first bore of the first component, the abutment surface and the bore surface generating opposing axial forces along the longitudinal axis in response to the abutment surface and the bore surface contacting each other.

In another aspect, there is provided a transfer tube assembly comprising: a first component having a first bore; a second component having a second bore; a transfer tube fluidly connecting the first component to the second component, the transfer tube extending along a longitudinal axis from a first end to a second end, the first end slidably engaged in sealing relation with the first component and the second end slidably engaged in sealing relation to the second component, the transfer tube having a shoulder projecting from an outer surface thereof and engageable with a corresponding stopper for limiting axial movement of the transfer tube relative to the first and second components, the shoulder having a conical surface facing a corresponding chamfered edge surface of the first bore of the first component, the conical surface and the chamfered edge surface spaced by a nominal gap.

In a further aspect, there is provided a transfer tube assembly for an aircraft engine, the transfer tube assembly comprising: a first component having a bore circumscribed by a bore surface; a transfer tube fluidly connected to the first component, the transfer tube extending along a longitudinal axis; wherein a first end portion of the transfer tube is axially received in slidable relation in the bore of the first component, the transfer tube having a shoulder extending from an outer surface thereof, the shoulder engageable with a stopper for limiting the axial movement of transfer tube relative to the first component, the shoulder having a bore engaging surface facing the bore surface of the first component, the bore engaging surface and the bore surface defining a contact interface having an axial component and a radial component relative to the longitudinal axis.

DESCRIPTION OF THE DRAWINGS

Reference is now made to the accompanying figures in which.

DETAILED DESCRIPTION

Figure 1:
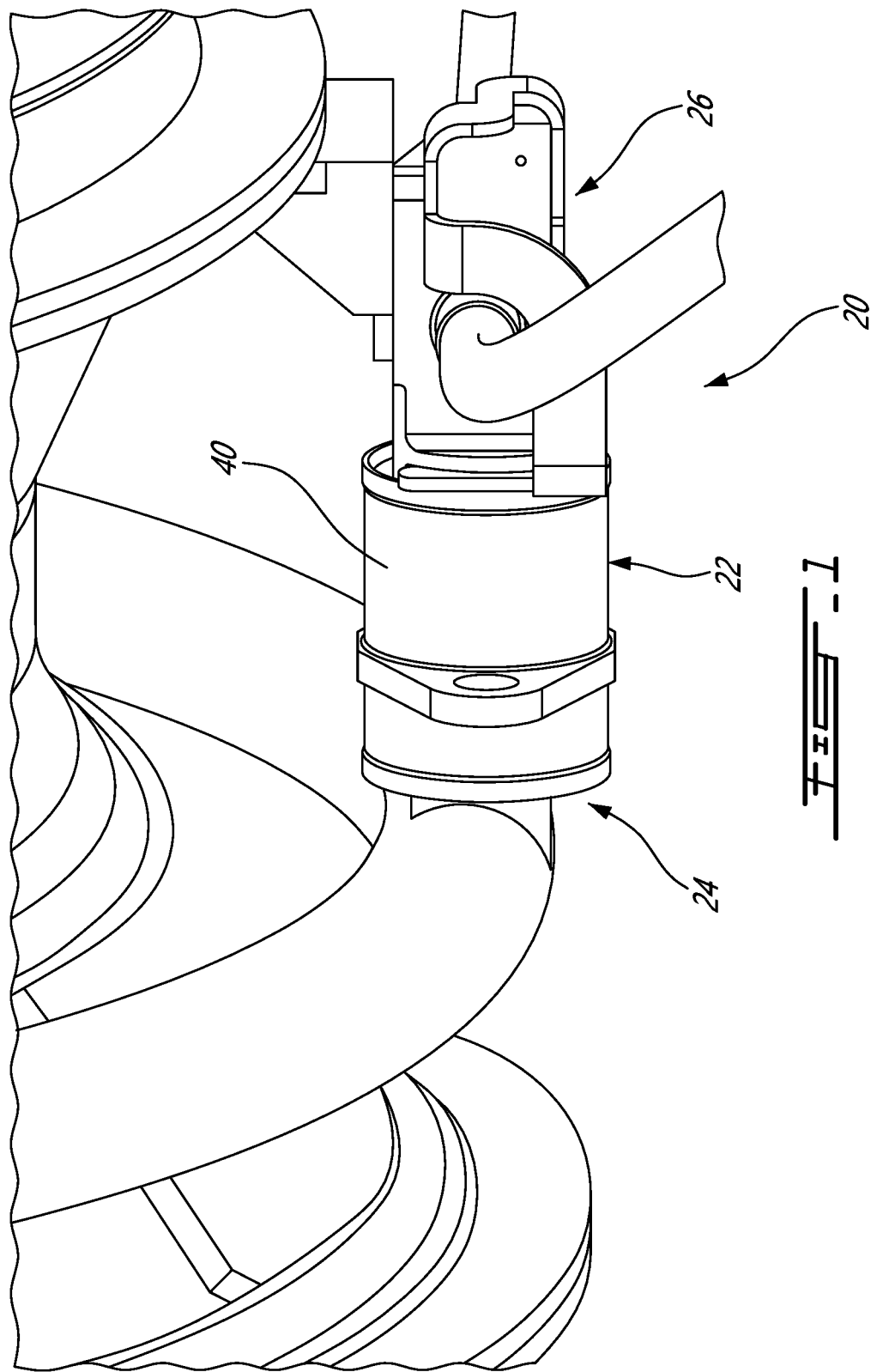
FIG. 1 is an isometric view of an embodiment of a transfer tube assembly.

FIG. 1 illustrates a transfer tube assembly 20 comprising a transfer tube unit 22 fluidly connecting a first component 24 to a second component 26. According to the illustrated embodiment, the first component 24 is an inlet nozzle of a gas turbine engine fuel manifold and the second component 26 is a fuel manifold adapter. According to another embodiment, the transfer tube unit 22 could be integrated to a lubricant line, such as an oil feed line of a bearing housing of a gas turbine engine. The present disclosure, however, is not limited to gas turbine engines. Indeed, it is understood that the transfer tube unit 22 could be used to fluidly connect various types of components in a wide variety of environments.

Figure 2:
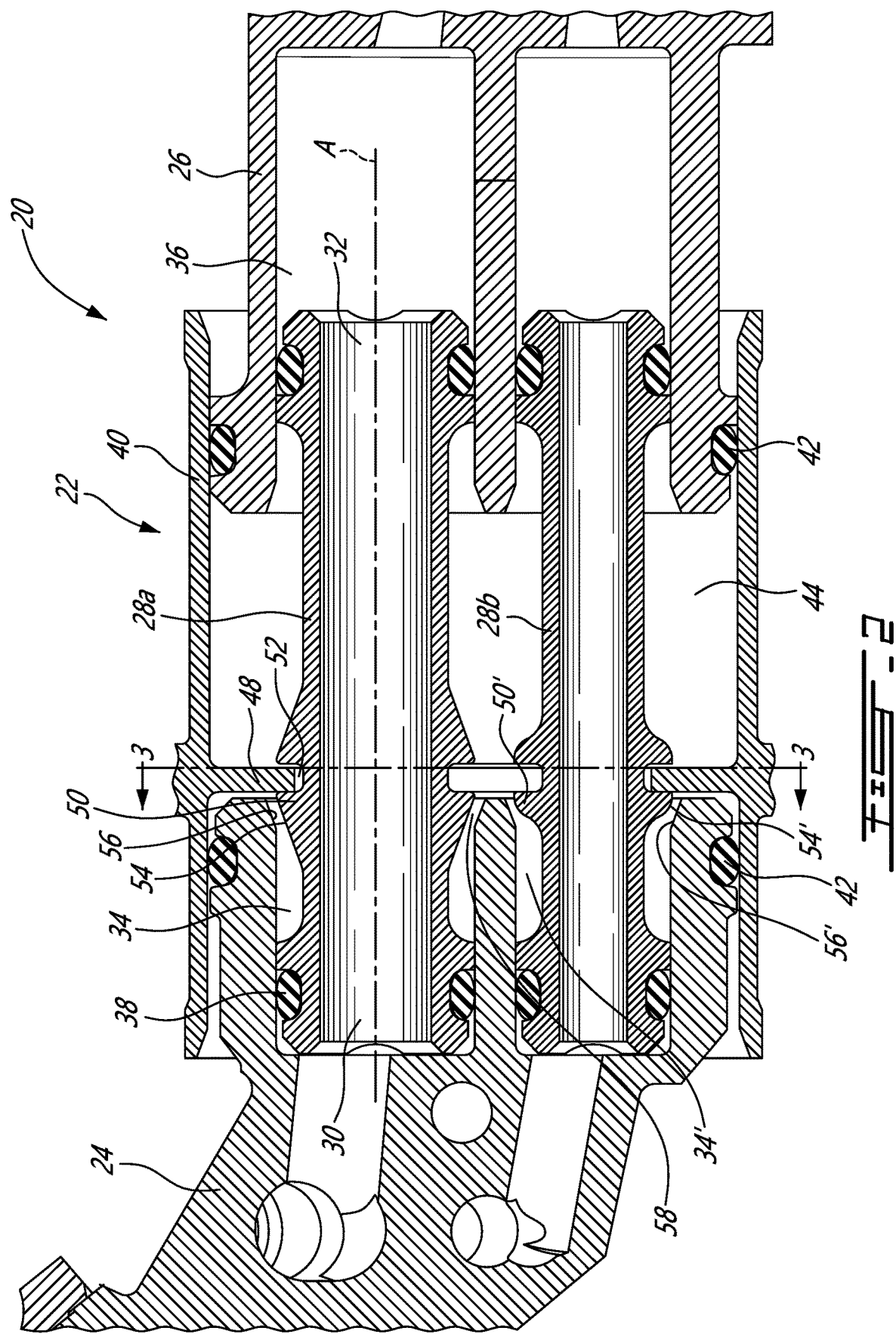
FIG. 2 is a longitudinal cross-section view of the transfer tube assembly illustrating a pair of transfer tubes having respective shoulders engageable with a stopper for limiting axial movement of the transfer tubes relative to the adjoining components, the shoulders having a geometry configured to generate axially opposing axial forces when contacting the surrounding chamfered surface of respective mating bores.

As shown in FIG. 2, the transfer tube unit 22 comprises at least one transfer tube 28*a* (e.g. a primary fuel transfer tube) having a rigid tubular body extending along a longitudinal axis A from a first end 30 to a second end 32. The tubular body may be made of various materials depending its intended environment of use. For instance, when used as part of a fuel manifold of a gas turbine engine, the transfer tube 28*a* may be made out of stainless steel. The first end 30 of tube 28*a* is sealingly slidably received in a first bore 34 of the first component 24, whereas the second end 32 of the tube is sealingly slidably received in a second bore 36 of the second component 26. Seals, such as O-rings 38, may be provided at the first and second ends 30, 32 of the transfer tube 28*a* for sealing engagement in the bore of the first and second components 24, 26, respectively. The O-rings 38 may be removably mounted in corresponding annular seats integrally formed in the outer cylindrical surface of the transfer tube 28*a*.

Figure 3:
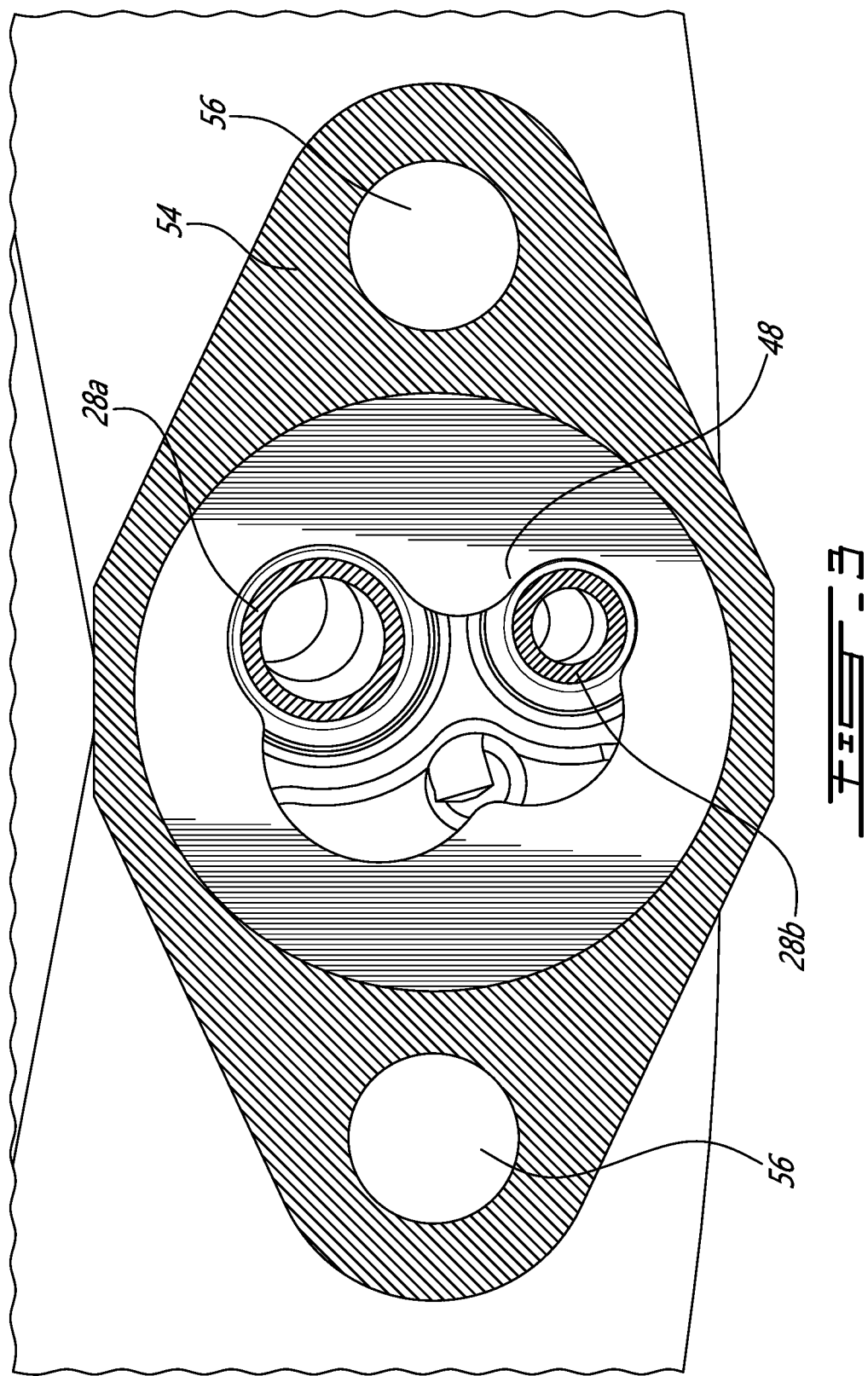
FIG. 3 is a cross-section view taken along line 3-3 of FIG. 2.
Figure 4:
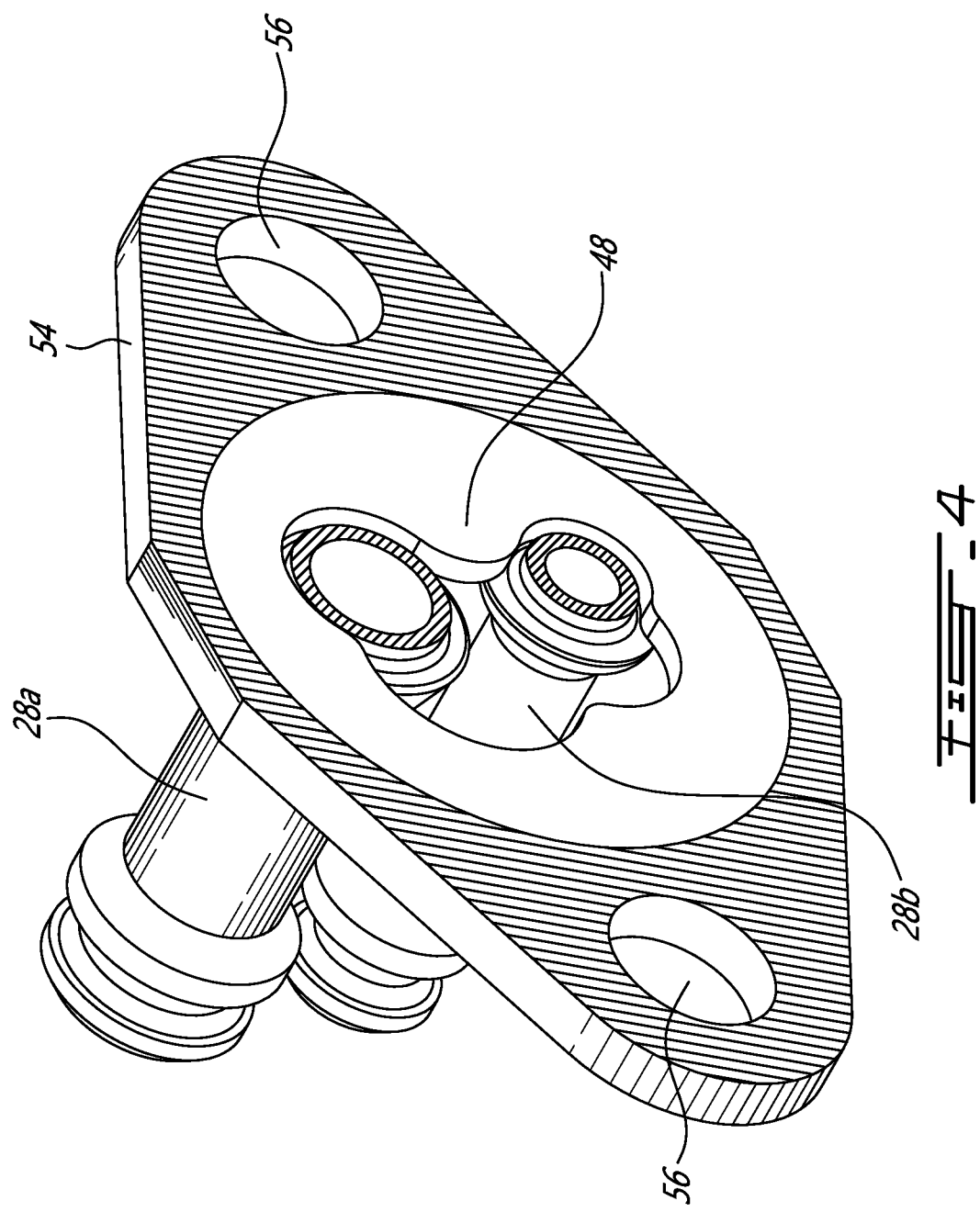
FIG. 4 is an isometric view illustrating the overlapping portion of the transfer tube shoulders and the stopper.

According to some embodiments, the transfer tube unit 22 further comprises a drain sleeve 40 extending between and sealingly connected at opposite ends to the first and second components 24, 26. As shown in FIG. 2, O-rings 42 may be mounted to the adjacent ends of the first and second components 24, 26 for sealing engagement with the inner cylindrical surface of the sleeve 40, thereby providing for the creation of a sealed cavity 44 around the at least one transfer tube 28*a*. The sealed cavity 44 is configured to trap any fluid that may leak over O-rings 38 at the interface between the transfer tube 28*a* and the bore of the first and second components 24, 26. A return conduit (not shown) may be fluidly connected to the sealed cavity 44 for returning any collected fluid into the fluid system. In addition to its sealing function, the sleeve 40 may act has an axial retention feature for limiting back and forth movement of the transfer tube 28a relative to the first and second components 24, 26. For instance, the drain sleeve 40 may include a stopper 48 for engagement with a corresponding shoulder 50 projecting outwardly from an outer surface of the at least one transfer tube 28a. According to some embodiments, the stopper 48 is provided in the form of an annular inner shoulder projecting from the inner surface of the sleeve 40. Still according to some embodiments, the stopper 48 may be engaged in a groove 52 defined in the shoulder 50 of the transfer tube 28a to limit the axial movement of the transfer tube 28a relative to the first and second components 24, 26 in both axial directions. After having been engaged over the adjacent ends of the first and second components 24, 26, the sleeve 40 may be secured in position by securely attaching the sleeve to an adjacent stationary structure (not shown). The person skilled in the art will appreciate that the axial retaining function can be done via a stopper interfacing with the sleeve 40; for instance, in either the sleeve 40 or first or second component 24, 26 grooves 52 for stoppers 48 can be provided which can securely engage the sleeve 40 and limit travel. As shown in FIGS. 1, 3 and 4, this can be done via a flange 54 extending from an outer surface of the sleeve 40. For instance, holes 56 can be provided in the flange 54 to allow the sleeve 40 to be securely bolted in position.

According to some embodiments, the stopper providing the desired axial retention function could be integrated to a component other than the drain sleeve 40 and the drain sleeve could be omitted. For instance, the stopper could form part of an adjacent stationary structure or it could be provided on the first or second component 24, 26. The skilled reader will thus understand that various axial retention arrangements are contemplated beyond the illustrated drain sleeve retention feature.

According to the exemplary embodiment shown in FIG. 2, the transfer tube shoulder 50 has a conical bore abutment/engaging surface 54 tapering in an axial direction towards the first end 30 of the transfer tube 28a. The conical abutment surface 54 defines a slope having an axial component and a radial component relative to the longitudinal axis A. As can be appreciated from FIG. 2, the conical abutment surface 54 is received in the entry portion of the first bore 34 of the first component 24. More particularly, the conical abutment surface 54 is disposed in facing relation with the chamfered edge surface 56 circumscribing the entry portion of the first bore 34. Still according to the illustrated embodiment, the surfaces 54, 56 have the same cone angle (i.e. same slope). The surfaces 54 and 56 are spaced by a nominal annular gap 58. The nominal gap 58 allows for potential misalignment between the first and second components 24, 26. However, if there is high radial/tangential deflection or misalignment due to tolerance stack-up, thermals, pressure deflection, etc., the gap 58 will close and the two surfaces 54,56 will contact each other. Due to the conical profile of the two mating surfaces 54, 56, the reaction forces at the surface interface will generate opposing axial forces, which reduce the resistance to axial sliding allowing the transfer tube 28a to slide at an extremum. This reduces the risk of the transfer tube shoulder 54 interfering with the mating bore in addition to helping sliding movement between the transfer tube 28a and the first component 24. The two conical contact surfaces 54, 56 provide for a more even load distribution, which reduces the risk of fretting whenever there is radial interference between the parts. It allows to accommodate thermal growth by not interfering with the back and forth sliding of the transfer tube relative to the first component when the surfaces 54, 56 abut against each other. In addition, the nominal gap 58 can be greater due to the similar geometric profile of surfaces 54, 56, thereby allowing accommodating greater radial offsets between the first and second components 24, 26. This particularly useful in installation where the transfer tubes are short due to tight envelope constraints. It is however understood that the mating shapes and angles of surfaces 54,56 can be different so long as the resulting contact force has an opposing axial component in the transfer tube 28a. For instance, alternative embodiments entail any geometric shape or cone angles which result in opposing axial components in the transfer tube and which would reduce the resistance to axial sliding in the event of a radial/tangential misalignment.

In that regard, FIG. 2 illustrates an example of a second transfer tube 28b (e.g. a secondary fuel transfer tube) having a rounded shoulder profile. According to this alternative, the bore engagement surface 54' of the transfer tube shoulder 50' extends along a curve having axial and radial components. Still according to this alternative, the curved surface 54' is engageable with the conical surface 56' (i.e. the chamfered edge surface) circumscribing the entry of the associated bore 34' in the first component 24. The curve of the bore engagement surface 54' is configured to maximise the contact surface between the wall of the bore 34' and the transfer tube 28b. This promotes more uniform load distribution by avoiding a single point of load transfer between the transfer tube shoulder 50' and the wall of the bore 34' in the event surface 54' contacts surface 56'. The other features of the second transfer 28b are similar to the first transfer tube 28a and will thus not be herein repeated for brevity.

For embodiments where the transfer tube unit 22 comprises more than one transfer tubes, it is understood that the transfer tubes may have similar or different shoulder profiles.

The transfer tube assembly 20 is assembled by first installing the first and second transfer tubes 28a, 28b in the drain sleeve 40. The tubes 28a, 28b are axially inserted one by one in the sleeve 40 and engaged in respective seats formed in the inner shoulder acting as the stopper 48. As shown in FIGS. 3 and 4, the stopper 48 is engaged in overlapping relation with shoulders 50, 50' to limit axial movement of the transfer tubes 28a, 28b. Then, this subassembly is sequentially slidably axially engaged with the first and second components 24, 26 as shown in FIG. 2. The assembly is completed by securing the drain sleeve 40 in position. This may be achieved by securely engaging the stopper 48 with respect to the groove 52 of the sleeve 40 or first or second component 24, 26 to an adjacent stationary structure (not shown).

Figure 5:
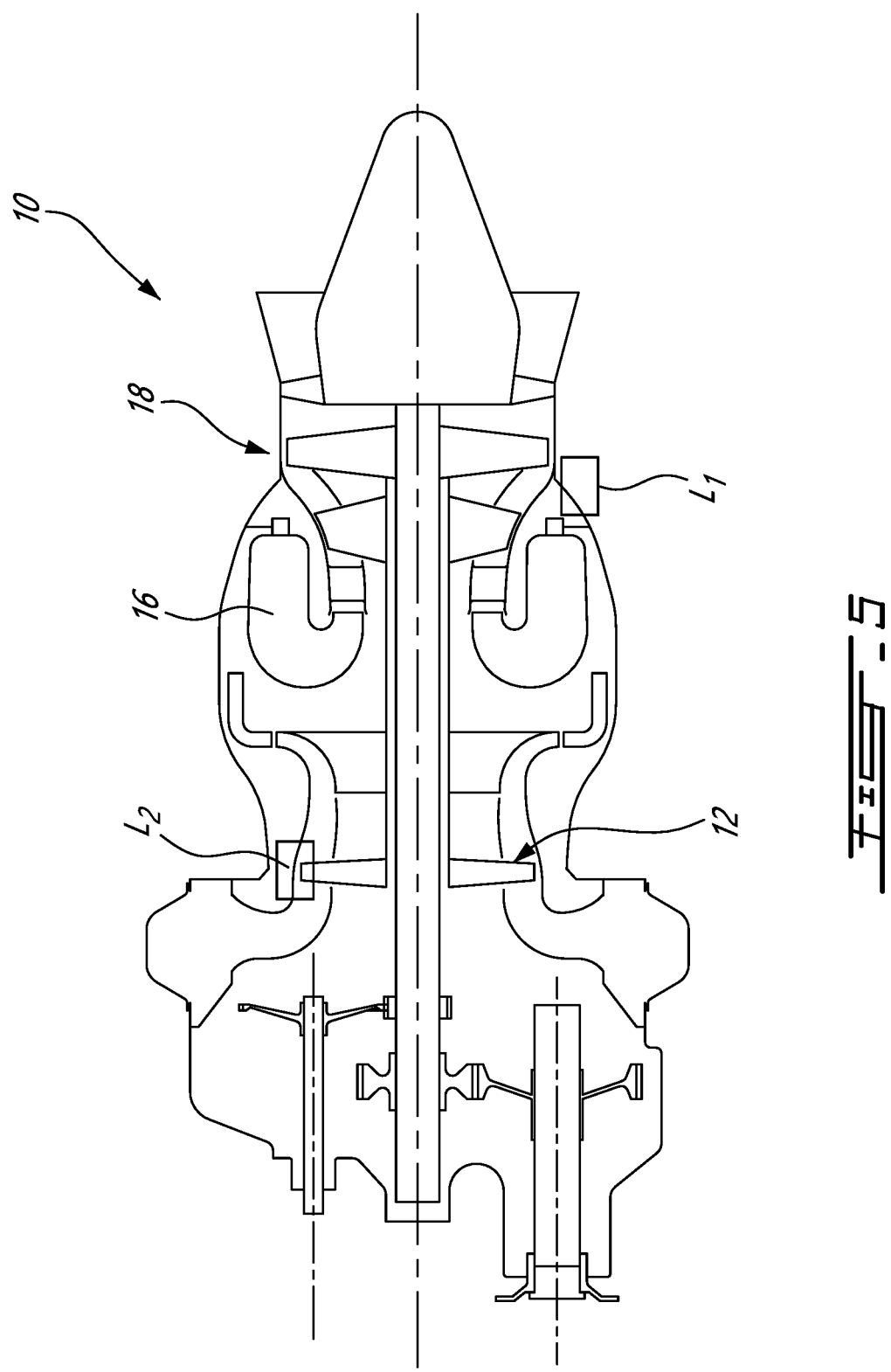
FIG. 5 is a schematic cross-section view of a gas turbine engine in which the transfer tube assembly may be installed.

FIG. 5 illustrates a gas turbine engine 10 with which the transfer tube assembly 20 may be configured. According to the illustrated example, the engine 10 is a turboshaft engine generally comprising in serial flow communication a compressor 12 for pressurizing the air, a combustor 16 in which the compressed air is mixed with fuel and ignited for generating an annular stream of hot combustion gases, and a turbine section 18 for extracting energy from the combustion gases. The transfer tube assembly 20 may be used in various sections of the engine 10. For instance, it may be used in the engine hot section at location L1 as part of the fuel manifold of the combustor 16. Alternatively, it can be used in the cold section of the engine at location L2 as part of a fluid carrying transfer tube system between engine cases. In addition, it is understood that the transfer tube assembly 20 may be included in various engines other than the one described above as well as in other types of equipment. For instance, it could be used in an aircraft engine, such as a turbofan, a turboprop, a hybrid engine, a compounded engine or an auxiliary power unit to name a few.

The embodiments described in this document provide non-limiting examples of possible implementations of the present technology. Upon review of the present disclosure, a person of ordinary skill in the art will recognize that changes may be made to the embodiments described herein without departing from the scope of the present technology. Indeed, various modifications could be implemented by a person of ordinary skill in the art in view of the present disclosure, which modifications would be within the scope of the present technology.

The invention claimed is:

1. A transfer tube assembly for an aircraft engine comprising:
   a first component having a first bore;
   a second component having a second bore;
   a transfer tube fluidly connecting the first component to the second component, the transfer tube extending along a longitudinal axis from a first end to a second end, the first end sealingly slidably received in the first bore of the first component and the second end sealingly slidably received in the second bore of the second component, the transfer tube having a shoulder projecting from an outer surface thereof and engageable with a corresponding stopper for limiting axial movement of the transfer tube relative to the first and second components, the shoulder having an abutment surface facing a corresponding bore surface of the first bore of the first component, the abutment surface and the bore surface generating opposing axial forces along the longitudinal axis in response to the abutment surface and the bore surface contacting each other; and
   a drain sleeve extending between and sealingly connected at opposite ends to the first and second components, the transfer tube disposed in the drain sleeve, and wherein the stopper includes an inner shoulder projecting from an inner surface of the drain sleeve for engagement with the shoulder of the transfer tube.

2. The transfer tube assembly of claim 1, wherein the abutment surface and the bore surface extend around the longitudinal axis, and wherein the abutment surface and the bore surface have a contact interface, the contact interface having an axial component relative to the longitudinal axis.

3. The transfer tube assembly of claim 2, wherein at least one of the abutment surface and the bore surface is conical.

4. The transfer tube assembly of claim 3, wherein both the abutment surface and the bore surface are conical.

5. The transfer tube assembly of claim 3, wherein the abutment surface is curved when viewed in a longitudinal cross-section of the transfer tube, and wherein the bore surface is conical.

6. The transfer tube assembly of claim 1, wherein each of the abutment surface and the bore surface defines a slope relative to the longitudinal axis when viewed in an axially extending cross-section plane, the slope having an axial component along the longitudinal axis of the transfer tube.

7. The transfer tube assembly of claim 1, wherein the drain sleeve has a flange extending from an outer surface thereof for attachment to an adjacent stationary structure.

8. The transfer tube assembly of claim 1, wherein the bore surface of the first bore includes a chamfered edge surface at an entry of the first bore, and wherein the transfer tube carries a seal at the first end thereof, and wherein the shoulder is axially spaced from the seal and received in the entry of the first bore for engagement with the chamfered edge surface.

9. A transfer tube assembly for an aircraft engine, the transfer tube comprising:
   a first component having a first bore;
   a second component having a second bore;
   a transfer tube fluidly connecting the first component to the second component, the transfer tube extending along a longitudinal axis from a first end to a second end, the first end slidably engaged in sealing relation with the first component and the second end slidably engaged in sealing relation to the second component, the transfer tube having a shoulder projecting from an outer surface thereof and engageable with a corresponding stopper for limiting axial movement of the transfer tube relative to the first and second components, the shoulder having a conical surface facing a corresponding chamfered edge surface of the first bore of the first component, the conical surface and the chamfered edge surface spaced by a nominal gap; and
   a drain sleeve extending between and sealingly connected at opposited ends to the first and second components, the transfer tube disposed in the drain sleeve, and wherein the stopper includes an inner shoulder projecting from an inner surface of the drain sleeve for engagement with the shoulder of the transfer tube.

10. The transfer tube assembly of claim 9, wherein the conical surface and the chamfered edge surface have an axial component along the longitudinal axis of the transfer tube.

11. The transfer tube assembly of claim 9, wherein the conical surface and the chamfered edge surface have a same cone angle.

12. The transfer tube assembly of claim 9, wherein the conical surface and the chamfered edge surface are configured to generate opposing axial reaction forces relative to the longitudinal axis when pushed against one another.

13. A transfer tube assembly for an aircraft engine, the transfer tube assembly comprising:
   a first component having a bore circumscribed by a bore surface;
   a transfer tube fluidly connected to the first component, the transfer tube extending along a longitudinal axis;
   wherein a first end portion of the transfer tube is axially received in slidable relation in the bore of the first component, the transfer tube having a shoulder extending from an outer surface thereof, the shoulder engageable with a stopper for limiting the axial movement of transfer tube relative to the first component, the shoulder having a bore engaging surface facing the bore surface of the first component, the bore engaging surface and the bore surface defining a contact interface having an axial component and a radial component relative to the longitudinal axis, and
   a drain sleeve sealingly connected to the first component and extending around the transfer tube, and wherein the stopper includes an inner shoulder projecting from an inner surface of the drain sleeve for engagement with the shoulder of the transfer tube.

14. The transfer tube assembly of claim 13, wherein the bore engaging surface and the bore surface are configured to generate axially opposite reaction forces upon the bore engaging surface and the bore surface being pushed against one another.

15. The transfer tube assembly of claim 14, wherein the bore surface is a chamfered edge surface at the entry of the bore, and wherein the bore engaging surface is received in the entry portion of the bore, the chamfered edge surface extending annularly around the bore surface.

16. The transfer tube assembly of claim 15, wherein the bore engaging surface and the chamfered edge surface are conical, and wherein the bore engaging surface and the chamfered edge surface have matching cone angles.

17. The transfer tube assembly of claim 14, wherein the bore engaging surface is curved.

18. The transfer tube assembly of claim 14, wherein the bore surface and the bore engaging surface have a different geometry.

\* \* \* \* \*